United States Patent
Huang

(10) Patent No.: US 11,062,119 B2
(45) Date of Patent: Jul. 13, 2021

(54) FINGERPRINT RECOGNITION METHOD AND DEVICE

(71) Applicant: BEIJING XIAOMI MOBILE SOFTWARE CO., LTD., Beijing (CN)

(72) Inventor: Xuebin Huang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 62 days.

(21) Appl. No.: 16/201,496

(22) Filed: Nov. 27, 2018

(65) Prior Publication Data

US 2019/0205612 A1 Jul. 4, 2019

(30) Foreign Application Priority Data

Jan. 3, 2018 (CN) .......................... 201810003666.0

(51) Int. Cl.
*G06K 9/00* (2006.01)
*G06K 9/03* (2006.01)

(52) U.S. Cl.
CPC ..... *G06K 9/00087* (2013.01); *G06K 9/00006* (2013.01); *G06K 9/00973* (2013.01); *G06K 9/03* (2013.01)

(58) Field of Classification Search
CPC ........... G06K 9/00087; G06K 9/00006; G06K 9/00973; G06K 9/03
See application file for complete search history.

(56) References Cited

U.S. PATENT DOCUMENTS

| 2001/0036301 | A1  | 11/2001 | Yamaguchi |
| 2017/0220846 | A1* | 8/2017  | Du ..................... G06K 9/00087 |
| 2018/0032792 | A1  | 2/2018  | Wang |
| 2018/0173923 | A1* | 6/2018  | Lee ...................... G06F 3/0412 |

FOREIGN PATENT DOCUMENTS

| CN | 101753305 A | 6/2010 |
| CN | 102752359 A | 10/2012 |
| CN | 105302383 A | 2/2016 |
| CN | 105790955 A | 7/2016 |
| CN | 106200879 A | 12/2016 |
| CN | 106778457 A | 5/2017 |

(Continued)

OTHER PUBLICATIONS

European Search Report in the European application No. 18212873. 6, dated May 8, 2019.

*Primary Examiner* — Stephen G Sherman
(74) *Attorney, Agent, or Firm* — Syncoda LLC; Feng Ma

(57) ABSTRACT

A fingerprint recognition method includes: from a time when a finger is detected touching a fingerprint recognition portion, a contact area between the finger and the fingerprint recognition portion is acquired at preset time intervals; when the contact area is smaller than a preset area and a number of repeated acquisition times does not reach a preset number of times, the number of repeated acquisition times is updated. The number of repeated acquisition times is configured to determine that fingerprint recognition fails when being accumulated to reach the preset number of times. Prior to the number of repeated acquisition times reaching the preset number of times, when it is detected that the finger leaves the fingerprint recognition portion, the number of repeated acquisition times is reset.

19 Claims, 4 Drawing Sheets

From a time when a finger is detected touching a fingerprint recognition portion, a contact area, acquired by the fingerprint recognition portion, between the finger and the fingerprint recognition portion is acquired at preset time intervals — 101

When the contact area is smaller than a preset area and a number of repeated acquisition times does not reach a preset number of times, the number of repeated acquisition times is updated — 102

Before the number of repeated acquisition times reaches the preset number of times, when it is detected that the finger leaves the fingerprint recognition portion, the number of repeated acquisition times is reset — 103

(56) References Cited

FOREIGN PATENT DOCUMENTS

| | | |
|---|---|---|
| CN | 107016273 A | 8/2017 |
| CN | 107016337 A | 8/2017 |
| CN | 107025419 A | 8/2017 |
| CN | 107195010 A | 9/2017 |
| EP | 3200125 A1 | 8/2017 |
| WO | 2017020168 A1 | 2/2017 |

* cited by examiner

FINGERPRINT RECOGNITION METHOD AND DEVICE

CROSS-REFERENCE TO RELATED APPLICATIONS

This application claims priority to Chinese Patent Application No. 201810003666.0, filed on Jan. 3, 2018, the disclosure of which is hereby incorporated by reference in its entirety.

BACKGROUND

Along with the development of fingerprint recognition technologies, more and more terminals are endowed with fingerprint recognition functions to verify identities of users by fingerprint recognition.

To ensure acquisition of sufficient fingerprint information for fingerprint recognition, a typical fingerprint recognition process makes such a requirement that a contact area between a finger and a fingerprint recognition device is larger than a preset area. When the contact area between the finger and the fingerprint recognition portion is larger than the preset area, the fingerprint recognition process triggers the fingerprint recognition device to acquire fingerprint information of the finger for fingerprint recognition. When the contact area between the finger and the fingerprint recognition device is smaller than the preset area, the fingerprint recognition process updates a number of repeated acquisition times; if the number of repeated acquisition times does not reach a preset number of times, the fingerprint recognition process acquires the contact area between the finger and the fingerprint recognition portion again after an interval of a certain period of time and detects whether the reacquired contact area is larger than the preset area or not; and if the number of repeated acquisition times has reached the preset number of times, it is determined that fingerprint recognition of this time fails.

SUMMARY

According to a first aspect of the embodiments of the present disclosure, there is provided a fingerprint recognition method, which includes: from a time when a finger is detected touching a fingerprint recognition portion, a contact area, acquired by the fingerprint recognition portion, between the finger and the fingerprint recognition portion is acquired at preset time intervals; when the contact area is smaller than a preset area and a number of repeated acquisition times does not reach a preset number of times, the number of repeated acquisition times is updated, herein the number of repeated acquisition times is configured to determine that fingerprint recognition fails when being accumulated to reach the preset number of times; and before the number of repeated acquisition times reaches the preset number of times, when it is detected that the finger leaves the fingerprint recognition portion, the number of repeated acquisition times is reset.

According to a second aspect of the embodiments of the present disclosure, there is provided a fingerprint recognition device, which includes: a processor and a memory arranged to store an instruction executable by the processor, herein the processor may be arranged to:

from a time when a finger is detected touching a fingerprint recognition portion, a contact area, acquired by the fingerprint recognition portion, between the finger and the fingerprint recognition portion is acquired at preset time intervals;

when the contact area is smaller than a preset area and a number of repeated acquisition times does not reach a preset number of times, update the number of repeated acquisition times, herein the number of repeated acquisition times is configured to determine that fingerprint recognition fails when being accumulated to reach the preset number of times; and before the number of repeated acquisition times reaches the preset number of times, when it is detected that the finger leaves the fingerprint recognition portion, reset the number of repeated acquisition times.

According to a third aspect of the embodiments of the present disclosure, there is provided a non-transitory computer-readable storage medium having stored thereon a computer program that, when executed by a processor, causes the processor to implement the steps of a fingerprint recognition method, the method includes: from a time when a finger is detected touching a fingerprint recognition portion, a contact area, acquired by the fingerprint recognition portion, between the finger and the fingerprint recognition portion is acquired at preset time intervals; when the contact area is smaller than a preset area and a number of repeated acquisition times does not reach a preset number of times, the number of repeated acquisition times is updated, herein the number of repeated acquisition times is configured to determine that fingerprint recognition fails when being accumulated to reach the preset number of times; and before the number of repeated acquisition times reaches the preset number of times, when it is detected that the finger leaves the fingerprint recognition portion, the number of repeated acquisition times is reset.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

In the related art, during fingerprint recognition, if the condition that a user raises a finger and presses a portion with the finger again occurs, a fingerprint recognition process does not clear a number of repeated acquisition times when the user presses the portion with the finger again, so that the number of repeated acquisition times for detecting the contact area when fingerprint recognition is performed again is reduced. Even though an identity of a user is correct, fingerprint recognition may also fail due to an insufficient number of repeated acquisition times, and a fingerprint recognition failure probability is finally increased.

According to a method provided by the embodiments of the present disclosure, an execution body of each step may be a terminal with a fingerprint recognition function. For example, the terminal may be a mobile phone, a tablet computer, an electronic book reader, multimedia playing equipment, navigation equipment, wearable equipment and the like. Optionally, the execution body of each step may be a processor of the terminal, for example, a fingerprint recognition process running in the processor. For convenient description, introductions and descriptions will be made in the following method embodiment with the condition that the execution body of each step is the processor of the terminal as an example, However, there are no limits made thereto.

Figure 1:
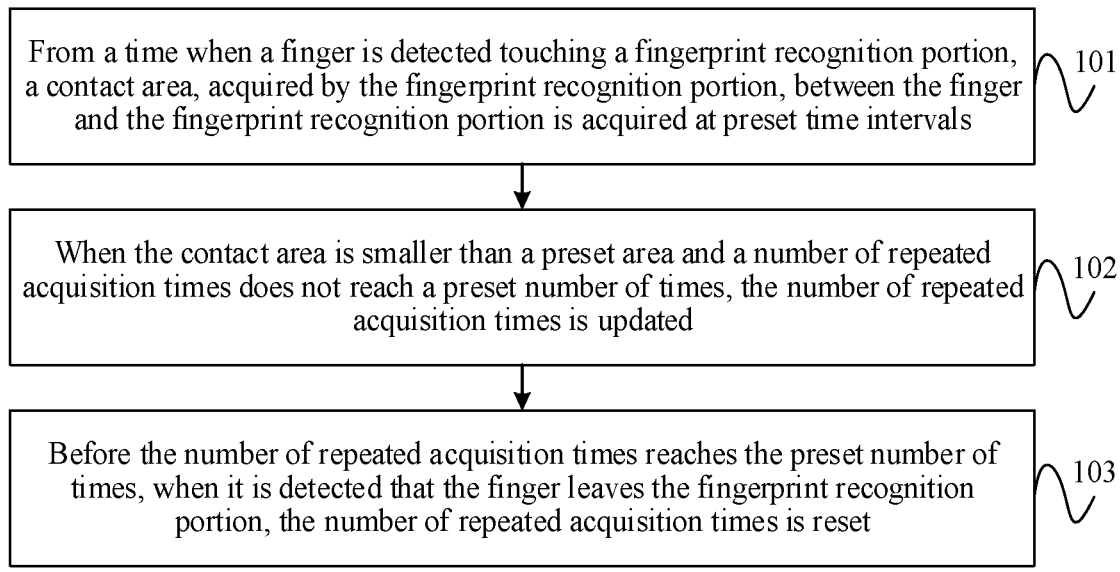
FIG. 1 is a flowchart showing a fingerprint recognition method, according to some embodiments.

FIG. 1 is a flowchart showing a fingerprint recognition method, according to some embodiments. The method may include the following operations or steps.

In step 101, from a time when a finger is detected touching a fingerprint recognition portion, acquire a contact area, acquired by the fingerprint recognition portion, between the finger and the fingerprint recognition portion at preset time intervals.

The fingerprint recognition portion may be a device arranged to acquire fingerprint information of a user. The fingerprint recognition portion may include a Touch Panel (TP) and a fingerprint sensor. During fingerprint recognition, the finger of the user touches the TP, and the fingerprint sensor may acquire fingerprint information of a finger part contacting with the TP. In some embodiments, the fingerprint sensor may comprise one or more of an optical sensor, an ultrasonic sensor, or a capacitance sensor.

When the user is required to perform fingerprint recognition, the finger touches the TP in the fingerprint recognition portion. Correspondingly, the fingerprint sensor of the fingerprint recognition portion, when detecting a touch of the finger, can send a starting signal to a processor. The starting signal can be configured to indicate the processor to call a fingerprint recognition process. The processor, after calling the fingerprint recognition process, can acquire the contact area, acquired by the fingerprint recognition portion, between the finger and the fingerprint recognition portion at the preset time interval, herein the preset time interval can be a preset empirical value, and every two adjacent preset time intervals may be the same and may also be different. Every time when acquiring the contact area between the finger and the fingerprint recognition portion, the processor can send an area acquisition instruction to the fingerprint sensor. The fingerprint sensor, after receiving the area acquisition instruction, can acquire a contact area between the finger and the TP. The fingerprint sensor can send the acquired contact area to the processor.

The various device components, blocks, or portions may have modular configurations, or are composed of discrete components, but nonetheless may be referred to as "modules" in general. In other words, the "modules" referred to herein may or may not be in modular forms.

In step 102, when the contact area is smaller than a preset area and a number of repeated acquisition times does not reach a preset number of times, the number of repeated acquisition times can be updated.

The processor, after determining the contact area according to touch information, can detect whether the contact area is smaller than the preset area or not. The preset area may be a preset empirical value and may be set according to an area of the TP of the fingerprint recognition portion and an area of the finger of the user. When the contact area between the finger and the TP in the fingerprint recognition portion is not smaller than the preset area, the fingerprint sensor may acquire sufficient fingerprint information for fingerprint recognition of the processor, herein the fingerprint information may be a fingerprint image of a contact part between the finger and the TP and may also be a fingerprint characteristic extracted from the fingerprint image, for example, fingerprint line information.

If it is detected that the contact area is smaller than the preset area and the number of repeated acquisition times does not reach the preset number of times, the processor can update the number of repeated acquisition times. The number of repeated acquisition times may refer to a number of times that a contact area is acquired by the fingerprint recognition portion. The processor, every time when detecting that the contact area is smaller than the preset area, can increase a pre-updated value of the number of repeated acquisition times by 1 to obtain an updated value of the number of repeated acquisition times.

Exemplarily, the processor can detect whether the contact area is smaller than the preset area or not for the third time and detects that the contact area is smaller than the preset area. Before detection, a value of the number of repeated acquisition times may be 2. The processor, when detecting that the contact area is smaller than the preset area, increases the value of the number of repeated acquisition times by 1, and the updated value of the number of repeated acquisition times is 3.

When the number of repeated acquisition times is accumulated to reach the preset number of times, the processor can determine that fingerprint recognition fails. The preset number of times may be a preset empirical value. For example, the preset number of times is 10. When the processor continuously detects that the contact area is smaller than the preset area for 10 times, the number of repeated acquisition times is 10 and reaches the preset number of times, and in such a case, the processor determines that fingerprint recognition fails.

In some embodiments, when it is detected that the contact area is larger than the preset area, the processor may acquire the fingerprint information of the finger through the fingerprint sensor of the fingerprint recognition portion and then determine a fingerprint recognition result according to the fingerprint information. When it is detected that the contact area is larger than the preset area, the processor may send a fingerprint acquisition request to the fingerprint recognition portion. The fingerprint recognition portion, after receiving the fingerprint acquisition request, may acquire the fingerprint information of the contact part between the finger and the TP through the fingerprint sensor. The fingerprint recognition portion may send the acquired fingerprint information to the processor, and the processor may determine the fingerprint recognition result according to the fingerprint information. If the acquired fingerprint is the same as pre-stored fingerprint information, the processor may determine that fingerprint recognition succeeds and reset the number of repeated acquisition times; and if the acquired fingerprint information is different from the pre-stored fingerprint information, the processor may determine that fingerprint recognition fails and reset the number of repeated acquisition times, herein the pre-stored fingerprint information may refer to fingerprint information input by the user in advance.

In step 103, prior to the number of repeated acquisition times reaching the preset number of times, when it is detected that the finger leaves the fingerprint recognition portion, the number of repeated acquisition times can be reset.

Prior to the number of repeated acquisition times reaching the preset number of times, the processor may detect whether the finger leaves the TP of the fingerprint recognition portion or not. When it is detected that the finger leaves the TP of the fingerprint recognition portion, the processor may determine that fingerprint recognition of this time ends and resets the number of repeated acquisition times.

In some implementations, the processor, every time when detecting that the contact area is smaller than the preset area and updating the number of repeated acquisition times, may send a detection instruction to the fingerprint recognition portion. The detection instruction may be configured to indicate the fingerprint recognition portion to detect whether the finger has ever left the fingerprint recognition portion after the finger touches the TP or not.

Correspondingly, the fingerprint recognition portion may detect whether the finger has ever left the TP or not. The fingerprint recognition portion may detect whether the finger has ever left the TP or not through a pressure sensor, may also detect whether the finger has ever left the TP or not through an infrared sensor and may further detect whether the finger has ever left the TP or not through the fingerprint sensor. A manner in which the fingerprint recognition portion detects whether the finger has ever left the TP or not is not specifically limited in the embodiment of the present disclosure.

The fingerprint recognition portion, if detecting that the finger has ever left the fingerprint recognition portion, may send a first detection result to the processor. The first detection result may be configured to indicate that the finger has ever left the fingerprint recognition portion. Correspondingly, the processor, after receiving the first detection result, may determine that fingerprint recognition of this time ends and resets the number of repeated acquisition times.

The fingerprint recognition portion, if detecting that the finger has never left the fingerprint recognition portion, may send a second detection result to the processor. The second detection result may be configured to indicate that the finger has never left the fingerprint recognition portion. Correspondingly, the processor, after receiving the second detection result, may determine that the finger has never left the fingerprint recognition portion and continues performing fingerprint recognition.

In some implementations, in a fingerprint recognition process, the fingerprint recognition portion, when detecting that the finger leaves the fingerprint recognition portion, may send a hardware interrupt to the processor, the hardware interrupt being configured to indicate that the finger leaves the fingerprint recognition portion. The hardware interrupt may be implemented through a hardware signal, for example, a change in a high/low level of a signal. The processor, after receiving the hardware interrupt, may determine that the finger has left the fingerprint recognition portion, immediately end fingerprint recognition and reset the number of repeated acquisition times.

In the embodiments of the present disclosure, when it is detected that the finger leaves the fingerprint recognition portion, the number of repeated acquisition times may be reset to ensure that the number of repeated acquisition times is still sufficient for the processor to detect whether the contact area is larger than the preset area or not when the finger leaves and presses the portion again for fingerprint recognition and avoid a fingerprint recognition failure caused by an insufficient number of repeated acquisition times, so that a success rate of fingerprint recognition is increased.

A device may be provided according to some embodiments of the present disclosure to execute various method embodiments of the present disclosure. Some details of the device embodiments of the present disclosure are not repeated and can refer to the method embodiments discussed above.

Figure 2:
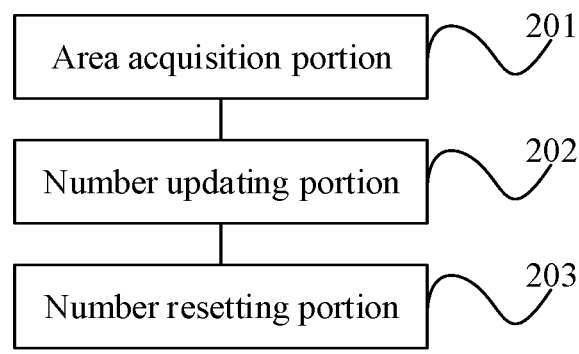
FIG. 2 is a block diagram illustrating a fingerprint recognition device, according to some embodiments.

FIG. 2 is a block diagram illustrating a fingerprint recognition device, according to some embodiments. The device has a function implementing the abovementioned method examples, and the function may be realized by hardware and may also be realized by execution of corresponding software by the hardware. The device may include: an area acquisition portion 201, a number updating portion 202 and a number resetting portion 203.

The area acquisition portion 201 is arranged to, from a time when a finger is detected touching a fingerprint recognition portion, acquire a contact area, acquired by the fingerprint recognition portion, between the finger and the fingerprint recognition portion at preset time intervals.

The number updating portion 202 is arranged to, when the contact area is smaller than a preset area and a number of repeated acquisition times does not reach a preset number of times, update the number of repeated acquisition times, herein the number of repeated acquisition times is configured to determine that fingerprint recognition fails when being accumulated to reach the preset number of times.

The number resetting portion 203 is arranged to, prior to the number of repeated acquisition times reaching the preset number of times, when it is detected that the finger leaves the fingerprint recognition portion, reset the number of repeated acquisition times.

In some embodiments of the present disclosure, when it is detected that the finger leaves the fingerprint recognition portion, the number of repeated acquisition times may be reset to ensure that the number of repeated acquisition times is still sufficient for the processor to detect whether the contact area is larger than the preset area or not when the finger leaves and presses the portion again for fingerprint recognition and avoid a fingerprint recognition failure caused by an insufficient number of repeated acquisition times, so that a success rate of fingerprint recognition is increased.

In some embodiments, the number updating portion 202 may be arranged to increase a pre-updated value of the number of repeated acquisition times by 1 to obtain an updated value of the number of repeated acquisition times, herein an initial value of the number of repeated acquisition times may be 0.

Figure 3:
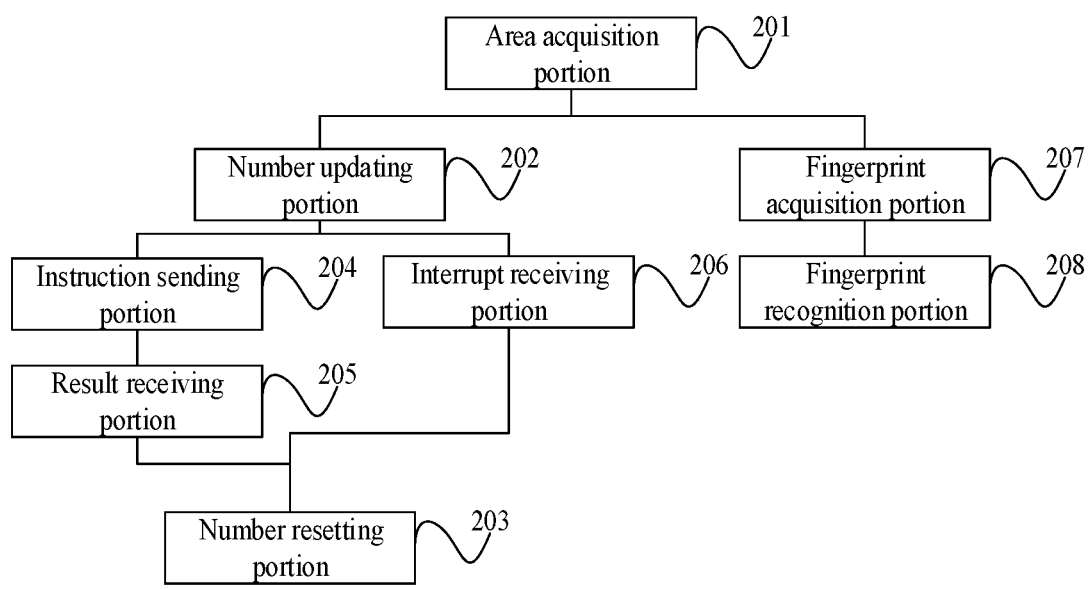
FIG. 3 is a block diagram illustrating a fingerprint recognition device, according to some embodiments.

In some embodiments, as shown in FIG. 3, the device may further include: an instruction sending portion 204 and a result receiving portion 205.

The instruction sending portion 204 may be arranged to, every time when the number of repeated acquisition times is updated, send a detection instruction to the fingerprint recognition portion, the detection instruction being configured to indicate the fingerprint recognition portion to detect whether the finger has ever left the fingerprint recognition portion after the time when the finger is detected touching the fingerprint recognition portion.

The result receiving portion 205 may be arranged to receive a first detection result or second detection result sent from the fingerprint recognition portion, herein the first detection result may be configured to indicate that the finger has ever left the fingerprint recognition portion, and the second detection result may be configured to indicate that the finger has never left the fingerprint recognition portion.

In some embodiments, as illustrated in FIG. 3, the device may further include an interrupt receiving portion 206.

The interrupt receiving portion 206 may be arranged to receive a hardware interrupt sent from the fingerprint recognition portion, the hardware interrupt being configured to indicate that the finger leaves the fingerprint recognition portion.

In some embodiments, as shown in FIG. 3, the device may further include: a fingerprint acquisition portion 207 and a fingerprint recognition portion 208.

The fingerprint acquisition portion 207 may be arranged to, when the contact area is larger than the preset area, acquire fingerprint information of the finger through a fingerprint sensor of the fingerprint recognition portion.

The fingerprint recognition portion 208 may be arranged to determine a fingerprint recognition result according to the fingerprint information of the finger.

It is to be noted that: when its functions are realized, the device provided in the above embodiment is only described with division of each abovementioned functional portion as an example and, during a practical application, the abovementioned functions may be allocated to different functional portions for realization according to a practical requirement, that is, a content structure of equipment is divided into different functional portions to realize all or part of the functions described above.

With respect to the device in the above embodiment, the specific manners for performing operations for individual portions therein have been described in detail in the embodiment regarding the method, which will not be elaborated herein.

Some embodiments of the present disclosure further provide a fingerprint recognition device, which may implement a fingerprint recognition method provided in the present disclosure. The device includes a processor and a memory arranged to store an instruction executable by the processor, herein the processor is arranged to:

from a time when a finger is detected touching a fingerprint recognition portion, acquire a contact area, acquired by the fingerprint recognition portion, between the finger and the fingerprint recognition portion at preset time intervals;

when the contact area is smaller than a preset area and a number of repeated acquisition times does not reach a preset number of times, update the number of repeated acquisition times, herein the number of repeated acquisition times is configured to determine that fingerprint recognition fails when being accumulated to reach the preset number of times; and before the number of repeated acquisition times reaches the preset number of times, when it is detected that the finger leaves the fingerprint recognition portion, reset the number of repeated acquisition times.

In some embodiments, the processor may be arranged to:

increase a pre-updated value of the number of repeated acquisition times by 1 to obtain an updated value of the number of repeated acquisition times, herein an initial value of the number of repeated acquisition times is 0.

Optionally, the processor may be further arranged to:

every time when the number of repeated acquisition times is updated, send a detection instruction to the fingerprint recognition portion, the detection instruction being configured to indicate the fingerprint recognition portion to detect whether the finger has ever left the fingerprint recognition portion after the time when the finger is detected touching the fingerprint recognition portion; and receive a first detection result or second detection result sent from the fingerprint recognition portion, herein the first detection result is configured to indicate that the finger has ever left the fingerprint recognition portion, and the second detection result is configured to indicate that the finger has never left the fingerprint recognition portion.

In some embodiments, the processor may be further arranged to:

receive a hardware interrupt sent from the fingerprint recognition portion, the hardware interrupt being configured to indicate that the finger leaves the fingerprint recognition portion.

In some embodiments, the processor may be further arranged to:

when the contact area is larger than the preset area, acquire fingerprint information of the finger through a fingerprint sensor of the fingerprint recognition portion; and determine a fingerprint recognition result according to the fingerprint information of the finger.

Figure 4:
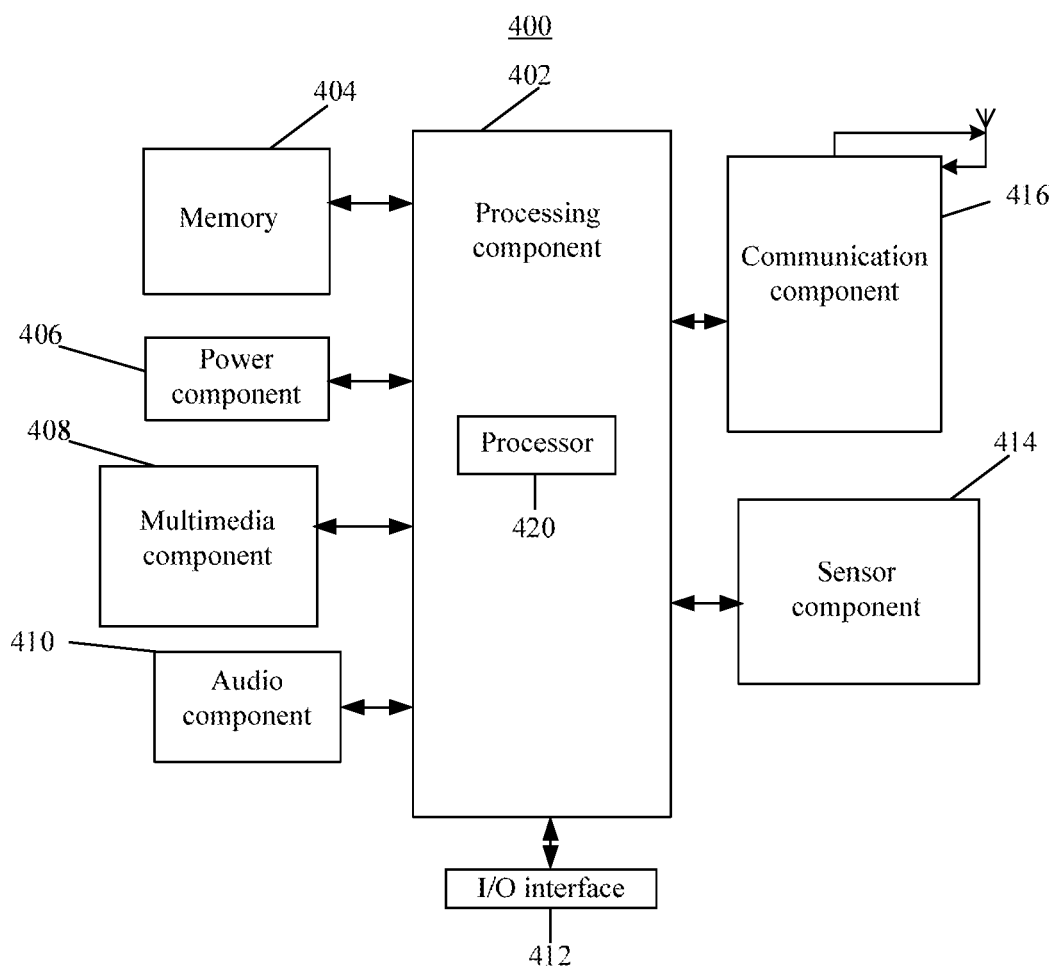
FIG. 4 is a structure diagram of a device, according to some embodiments.

FIG. 4 is a structure diagram of a device 400 according to some embodiments; For example, the device 400 may be a mobile phone, a tablet computer, navigation equipment, wearable equipment and the like.

Referring to FIG. 4, the device 400 may include one or more of the following components: a processing component 402, memory 404, a power component 406, a multimedia component 408, an audio component 410, an Input/Output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the abovementioned method. Moreover, the processing component 402 may include one or more portions which facilitate interaction between the processing component 402 and the other components. For instance, the processing component 402 may include a multimedia portion to facilitate interaction between the multimedia component 408 and the processing component 402.

The memory 404 is arranged to store various types of data to support the operation of the device 400. Examples of such data include instructions for any application programs (e.g., APPs or Applications) or methods operated on the device 400, contact data, phonebook data, messages, pictures, video, etc. The memory 404 may be implemented by any type of volatile or non-volatile memory devices, or a combination thereof, such as a Static Random-Access Memory (SRAM), an Electrically Erasable Programmable Read- Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the device 400. The power component 406 may include a power management system, one or more power supplies, and other components associated with generation, management and distribution of power for the device 400.

The multimedia component 408 includes a screen providing an output interface between the device 400 and a user. In some embodiments, the screen may include a Liquid Crystal Display (LCD) and a TP. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 408 includes a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 410 is arranged to output and/or input an audio signal. For example, the audio component 410 includes a Microphone (MIC), and the MIC is arranged to receive an external audio signal when the device 400 is in the operation mode, such as a call mode, a recording mode and a voice recognition mode. The received audio signal may further be stored in the memory 404 or sent through the communication component 416. In some embodiments, the audio component 410 further includes a speaker arranged to output the audio signal.

The I/O interface 412 provides an interface between the processing component 402 and a peripheral interface portion, and the peripheral interface portion may be a keyboard, a click wheel, a button and the like. The button may include, but not limited to: a home button, a volume button, a starting button and a locking button.

The sensor component 414 includes one or more sensors arranged to provide status assessment in various aspects for the device 400. For instance, the sensor component 414 may detect an on/off status of the device 400 and relative positioning of components, such as a display and small keyboard of the device 400, and the sensor component 414 may further detect a change in a position of the device 400 or a component of the device 400, presence or absence of contact between the user and the device 400, orientation or acceleration/deceleration of the device 400 and a change in temperature of the device 400. The sensor component 414 may include a proximity sensor arranged to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging application. In the embodiment of the present disclosure, the sensor component 414 at least includes san accelerometer, a gyroscope and a magnetometer.

The communication component 416 is arranged to facilitate wired or wireless communication between the device 400 and other equipment. The device 400 may access a communication-standard-based wireless network, such as a Wireless Fidelity (WiFi) network, a 2nd-Generation (2G) or 4th-Generation (4G) network or a combination thereof.

In some embodiments, the communication component 416 receives a broadcast signal or broadcast associated information from an external broadcast management system through a broadcast channel. In some embodiments, the communication component 416 further includes a Near Field Communication (NFC) portion to facilitate short-range communication. For example, the NFC portion may be implemented on the basis of a Radio Frequency Identification (RFID) technology, an Infrared Data Association (IrDA) technology, an Ultra-WideBand (UWB) technology, a Bluetooth (BT) technology and another technology.

In some embodiments, the device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is arranged to execute the abovementioned method.

In some embodiments, there is also provided a non-transitory computer-readable storage medium including an instruction, such as the memory 404 including an instruction, and the instruction may be executed by the processor 420 of the device 400 to implement the abovementioned method. For example, the non-transitory computer-readable storage medium may be a ROM, a Random-Access Memory (RAM), a Compact Disc Read-Only Memory (CD-ROM), a magnetic tape, a floppy disc, optical data storage equipment and the like.

According to a non-transitory computer-readable storage medium, when an instruction (or computer program) in the storage medium is executed by a processor of a device 400, the device 400 may execute the method provided in the embodiment shown in FIG. 1.

It is to be understood that "Multiple" mentioned in the present disclosure refers to two or more than two. "And/or" describes an association relationship of associated objects and represent that three relationships may exist. For example, A and/or B may represent three conditions, i.e., independent existence of A, coexistence of A and B and independent existence of B. Character "/" usually represents that previous and next associated objects form an "or" relationship.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A fingerprint recognition method, comprising:
   from a time when a finger is detected touching a fingerprint recognition portion, acquiring a contact area between the finger and the fingerprint recognition portion at preset time intervals;
   when the contact area is smaller than a preset area and a number of repeated acquisition times does not reach a preset number of times, updating the number of repeated acquisition times, wherein the number of repeated acquisition times is configured to determine that fingerprint recognition fails when being accumulated to reach the preset number of times; and
   in a case where the contact area acquired in each time is smaller than the preset area and prior to the number of repeated acquisition times reaching the preset number of times, when it is detected that the finger leaves the fingerprint recognition portion, resetting the number of repeated acquisition times, wherein the fingerprint recognition portion acquires fingerprint information of the finger when the contact area is larger than or equal to the preset area.

2. The method of claim 1, wherein the updating the number of repeated acquisition times comprises:
   increasing a pre-updated value of the number of repeated acquisition times by 1 to obtain an updated value of the number of repeated acquisition times, wherein an initial value of the number of repeated acquisition times is 0.

3. The method of claim 1, further comprising:
   every time when the number of repeated acquisition times is updated, sending a detection instruction to the fingerprint recognition portion, the detection instruction being configured to indicate the fingerprint recognition portion to detect whether the finger has ever left the fingerprint recognition portion after the time when the finger is detected touching the fingerprint recognition portion; and
   receiving a first detection result or second detection result sent from the fingerprint recognition portion, wherein the first detection result is configured to indicate that the finger has ever left the fingerprint recognition portion, and the second detection result is configured to indicate that the finger has never left the fingerprint recognition portion.

4. The method of claim 1, further comprising:
   receiving a hardware interrupt sent from the fingerprint recognition portion, the hardware interrupt being configured to indicate that the finger leaves the fingerprint recognition portion.

5. The method of claim 1, further comprising:
   when the contact area is larger than the preset area, acquiring the fingerprint information of the finger through a fingerprint sensor of the fingerprint recognition portion; and determining a fingerprint recognition result according to the fingerprint information of the finger.

6. A mobile terminal implementing the method of claim 1, wherein the mobile terminal is configured to reset the number of repeated acquisition times to ensure that the number of repeated acquisition times is still sufficient for the mobile terminal to detect whether the contact area is larger than the preset area when the finger leaves and presses the fingerprint recognition portion again, and to avoid a fingerprint recognition failure caused by an insufficient number of repeated acquisition times, thereby increasing a success rate of fingerprint recognition.

7. The mobile terminal of claim 6, further comprising a display screen.

8. The mobile terminal of claim 7, wherein the display screen is a touch screen.

9. The mobile terminal of claim 8, wherein the fingerprint recognition portion is part of the touch screen.

10. A fingerprint recognition device, comprising:
a processor, and
memory storing instructions executable by the processor, wherein the processor is arranged to:
from a time when a finger is detected touching a fingerprint recognition portion, acquire a contact area, acquired by the fingerprint recognition portion, between the finger and the fingerprint recognition portion at preset time intervals;
when the contact area is smaller than a preset area and a number of repeated acquisition times does not reach a preset number of times, update the number of repeated acquisition times, wherein the number of repeated acquisition times is configured to determine that fingerprint recognition fails when being accumulated to reach the preset number of times; and
in a case where the contact area acquired in each time is smaller than the preset area and prior to the number of repeated acquisition times reaching the preset number of times, when it is detected that the finger leaves the fingerprint recognition portion, reset the number of repeated acquisition times, wherein the fingerprint recognition portion acquires fingerprint information of the finger when the contact area is larger than or equal to the preset area.

11. The device of claim 10, wherein to update the number of repeated acquisition times, the processor is configured to:
increase a pre-updated value of the number of repeated acquisition times by 1 to obtain an updated value of the number of repeated acquisition times, wherein an initial value of the number of repeated acquisition times is 0.

12. The device of claim 10, wherein the processor is further arranged to:
every time when the number of repeated acquisition times is updated, send a detection instruction to the fingerprint recognition portion, the detection instruction being configured to indicate the fingerprint recognition portion to detect whether the finger has ever left the fingerprint recognition portion after the time when the finger is detected touching the fingerprint recognition portion; and
receive a first detection result or second detection result sent from the fingerprint recognition portion, wherein the first detection result is configured to indicate that the finger has ever left the fingerprint recognition portion, and the second detection result is configured to indicate that the finger has never left the fingerprint recognition portion.

13. The device of claim 10, wherein the processor is further arranged to:
receive a hardware interrupt sent from the fingerprint recognition portion, the hardware interrupt being configured to indicate that the finger leaves the fingerprint recognition portion.

14. The method of claim 10, wherein the processor is further arranged to:
when the contact area is larger than the preset area, acquire the fingerprint information of the finger through a fingerprint sensor of the fingerprint recognition portion; and
determine a fingerprint recognition result according to the fingerprint information of the finger.

15. A non-transitory computer-readable storage medium having stored thereon a computer program that, when executed by a processor, causes the processor to implement the steps of a fingerprint recognition method, the method comprising:
from a time when a finger is detected touching a fingerprint recognition portion, acquiring a contact area, acquired by the fingerprint recognition portion, between the finger and the fingerprint recognition portion at preset time intervals;
when the contact area is smaller than a preset area and a number of repeated acquisition times does not reach a preset number of times, updating the number of repeated acquisition times, wherein the number of repeated acquisition times is configured to determine that fingerprint recognition fails when being accumulated to reach the preset number of times; and
in a case where the contact area acquired in each time is smaller than the preset area and before the number of repeated acquisition times reaches the preset number of times, when it is detected that the finger leaves the fingerprint recognition portion, resetting the number of repeated acquisition times, wherein the fingerprint recognition portion acquires fingerprint information of the finger when the contact area is larger than or equal to the preset area.

16. The non-transitory computer-readable storage medium of claim 15, wherein updating the number of repeated acquisition times comprises:
increasing a pre-updated value of the number of repeated acquisition times by 1 to obtain an updated value of the number of repeated acquisition times, wherein an initial value of the number of repeated acquisition times is 0.

17. The non-transitory computer-readable storage medium of claim 15, wherein the method further comprises:
every time when the number of repeated acquisition times is updated, sending a detection instruction to the fingerprint recognition portion, the detection instruction being configured to indicate the fingerprint recognition portion to detect whether the finger has ever left the fingerprint recognition portion after the time when the finger is detected touching the fingerprint recognition portion; and
receiving a first detection result or second detection result sent from the fingerprint recognition portion, wherein the first detection result is configured to indicate that the finger has ever left the fingerprint recognition portion, and the second detection result is configured to indicate that the finger has never left the fingerprint recognition portion.

18. The non-transitory computer-readable storage medium of claim 15, wherein the method further comprises:

receiving a hardware interrupt sent from the fingerprint recognition portion, the hardware interrupt being configured to indicate that the finger leaves the fingerprint recognition portion.

19. The non-transitory computer-readable storage medium of claim 15, wherein the method further comprises:

when the contact area is larger than the preset area, acquiring the fingerprint information of the finger through a fingerprint sensor of the fingerprint recognition portion; and determining a fingerprint recognition result according to the fingerprint information of the finger.

\* \* \* \* \*